United States Patent
Liu et al.

(10) Patent No.: US 11,502,320 B2
(45) Date of Patent: Nov. 15, 2022

(54) SOLID OXIDE FUEL CELL/ELECTROLYTIC CELL AND ELECTRIC STACK PREPARED BASED ON ADDITIVE MANUFACTURING

(71) Applicant: INSTITUTE OF NEW MATERIALS, GUANGDONG ACADEMY OF SCIENCES, Guangdong (CN)

(72) Inventors: Min Liu, Guangdong (CN); Chen Song, Guangdong (CN); Taikai Liu, Guangdong (CN); Dongdong Dong, Guangdong (CN); Chunming Deng, Guangdong (CN); Kesong Zhou, Guangdong (CN); Yapeng Zhang, Guangdong (CN); Kui Wen, Guangdong (CN); Changguang Deng, Guangdong (CN); Wenyou Ma, Guangdong (CN)

(73) Assignee: INSTITUTE OF NEW MATERIALS, GUANGDONG ACADEMY OF SCIENCES, Guangdong (CN)

( * ) Notice: Subject to any disclaimer, the term of this patent is extended or adjusted under 35 U.S.C. 154(b) by 0 days.

(21) Appl. No.: 17/637,970

(22) PCT Filed: Dec. 3, 2020

(86) PCT No.: PCT/CN2020/133641
§ 371 (c)(1),
(2) Date: Feb. 24, 2022

(87) PCT Pub. No.: WO2022/077729
PCT Pub. Date: Apr. 21, 2022

(65) Prior Publication Data
US 2022/0271317 A1    Aug. 25, 2022

(30) Foreign Application Priority Data

Oct. 16, 2020 (CN) .......................... 202011112244.0

(51) Int. Cl.
*H01M 8/1213* (2016.01)
*B22F 10/366* (2021.01)
(Continued)

(52) U.S. Cl.
CPC ......... *H01M 8/1213* (2013.01); *B22F 10/366* (2021.01); *B22F 12/41* (2021.01);
(Continued)

(58) Field of Classification Search
None
See application file for complete search history.

(56) References Cited

U.S. PATENT DOCUMENTS

2020/0144647 A1    5/2020    Hall et al.

FOREIGN PATENT DOCUMENTS

| CN | 1588682 A | 3/2005 |
|---|---|---|
| CN | 102623732 A | 8/2012 |

(Continued)

OTHER PUBLICATIONS

First Office Action of priority document CN 202011112244.0 dated May 7, 2021.
(Continued)

*Primary Examiner* — Colin W. Slifka
(74) *Attorney, Agent, or Firm* — IP &T Group LLP

(57) ABSTRACT

Provided are a solid oxide fuel cell/electrolytic cell and electric stack, which relate to the field of cells. A metal support frame is molded in one step or more steps through the additive manufacturing technology. And then a fuel/electrolytic cell functional layer is formed on the metal support frame by means of thermal spraying, tape casting, screen printing or chemical vapor deposition method, and self-sealing of the solid oxide fuel cell/electrolytic cell is realized through a dense structure of electrolyte.

20 Claims, 3 Drawing Sheets

(51) Int. Cl.
  *H01M 8/1286* (2016.01)
  *B22F 12/49* (2021.01)
  *B33Y 10/00* (2015.01)
  *B33Y 80/00* (2015.01)
  *B22F 12/41* (2021.01)
  *H01M 8/12* (2016.01)

(52) U.S. Cl.
  CPC .............. *B22F 12/49* (2021.01); *B33Y 10/00* (2014.12); *B33Y 80/00* (2014.12); *H01M 8/1286* (2013.01); *H01M 2008/1293* (2013.01)

(56) References Cited

FOREIGN PATENT DOCUMENTS

| CN | 105470529 | A |   | 4/2016 |          |
|----|-----------|---|---|--------|----------|
| CN | 106374120 | A |   | 2/2017 |          |
| CN | 111403767 | A | * | 7/2020 | .............. C25B 1/04 |
| CN | 111403767 | A |   | 7/2020 |          |

OTHER PUBLICATIONS

Notification to Grant Patent Right for Invention of priority document CN 202011112244.0 dated Aug. 30, 2021.
First search of priority document CN 202011112244.0.
Supplementary search of priority document CN 202011112244.0.

* cited by examiner

SOLID OXIDE FUEL CELL/ELECTROLYTIC CELL AND ELECTRIC STACK PREPARED BASED ON ADDITIVE MANUFACTURING

CROSS-REFERENCE TO RELATED APPLICATION

This application is a National Phase application of PCT application no. PCT/CN2020/133641 filed on Dec. 3, 2020, which claims the priority to the Chinese patent application with the filing number CN202011112244.0, filed on Oct. 16, 2020 with the Chinese Patent Office, and entitled "Solid Oxide Fuel Cell/Electrolytic Cell and Electric Stack Prepared Based on Additive Manufacturing", the contents of which are incorporated herein by reference in entirety.

TECHNICAL FIELD

The present disclosure relates to the field of cells, and in particular, to a solid oxide fuel cell/electrolytic cell and electric stack prepared based on additive manufacturing.

BACKGROUND ART

The solid oxide fuel cell (SOFC for short) is an all-solid-state power generation device which directly converts chemical energy in fuel into electric energy through chemical reaction. Its energy conversion efficiency can reach 80% or more during co-generation, the power generation process is environment-friendly, and the fuel application range is wide, thus the solid oxide fuel cell has a broad application prospect in the fields such as distributed power stations, household co-generation systems, and portable power sources. As an inverse process of the SOFC, a solid oxide electrolyzer cell (SOEC for short) is an energy storage device that converts electrical energy and thermal energy into chemical energy, and may realize high-efficiency electrolysis of water to produce hydrogen. Suppose it can be used with a SOFC device to realize the dual functions of hydrogen production for energy storage and hydrogen consumption for power generation. In that case, it will have important significance for solving the energy crisis and environmental pollution problems.

At present, the global research focus is to reduce the operation temperature of the SOFC from 800-1000° C. to 800° C. or less to reduce the high-temperature reaction of component materials, reduce the preparation cost, and prolong the service life of the cell. This expands the selection range of SOFC materials and makes it possible to use metal support in the SOFC. The metal-supported SOFC uses porous metal as a support, then an anode, an electrolyte, and a cathode of a cell functional layer are sequentially prepared on the surface of the porous metal. Compared with the conventional anode-supported SOFC, metal-supported SOFC has the following advantages.

(1) The high mechanical strength, excellent ductility, and thermal conductivity of the metal material may effectively reduce the mechanical stress and thermal stress to which the cell is subjected during the service, and improve the service life and stability of the cell.

(2) By adopting a cheap metal material such as stainless steel to replace ceramic material to serve as a cell support, the cell functional layer may be made into a thin film form, so that the output performance of the cell is improved while the preparation cost of the SOFC is reduced.

(3) The metal material is easy to process and seal, then the difficulty in preparing and sealing the SOFC is reduced.

However, in the current metal-supported SOFC preparation process, generally, a porous metal body and a metal interconnector having a gas flow path are respectively prepared first, then the porous metal body and the metal interconnector are spliced into a metal support, and finally the cell functional layer is prepared on the metal support. This preparation process usually needs complex processes such as drilling, welding, packaging, powder metallurgy, and high-temperature sintering, so that the preparation efficiency, processing accuracy, and reliability are low, and one-step integrated flexible molding cannot be realized. In addition, the conventional metal-supported SOFC generally has only a single-side power generation function limited by the above preparation process, and it is difficult to further improve the mass energy density of the cell.

As described above, similar problems also exist in the metal-supported SOEC.

SUMMARY

The present disclosure provides a solid oxide fuel cell/electrolytic cell and electric stack prepared based on additive manufacturing. The solid oxide fuel cell/electrolytic cell can partially or completely improve, and even solve the problems that the preparation process and the structure of the solid oxide fuel cell/electrolytic cell are complex.

The present disclosure is implemented as follows.

In a first aspect, an embodiment of the present disclosure provides a solid oxide fuel cell/electrolytic cell prepared based on additive manufacturing, including a metal support frame and a cell/electrolytic cell functional layer, the metal support frame includes a dense region and a porous region, the dense region and the porous region of the metal support frame are integrally molded by additive manufacturing, and the dense region has a fuel flow path and has no oxygen airway.

It should be noted that the fuel flow path described in the embodiment of the present disclosure refers merely to a structure name, but it is not intended that it only can serve as a flow path for fuel circulation. For SOEC, it is raw material such as water or carbon dioxide for the reaction that circulates in the fuel flow path, and for SOFC, the fuel flow path is used for the circulation of a fuel.

In a second aspect, an embodiment of the present disclosure provides a fabrication method of a solid oxide fuel cell/electrolytic cell, and the fabrication method includes:

fabricating a metal support frame being in a composite structure through integral molding by adopting an additive manufacturing process, wherein the metal support frame has a dense region and a porous region that are laminated, wherein the dense region has a fuel flow path and has no oxygen airway (nor an air airway), and the fuel flow path is covered by the porous region; and fabricating, by thermal spraying, tape casting, screen printing or chemical vapor deposition method, an anode layer, an electrolyte layer, and a cathode layer by layer on the porous region, so as to form fuel/electrolytic cell functional layers. The edge of the electrolyte layer extends and covers the junction of the porous region and the dense region to realize self-sealing, wherein the additive manufacturing includes: controlling a scan pitch (scan interval) and power of a laser/electron beam, so that a scan pitch for fabricating the dense region is less than a scan pitch for fabricating the porous region, and power for fabricating the dense region is greater than or equal to power for fabricating the porous region, so as to adjust a distance between molten pools of a printing material, thus forming the dense region and the porous region, respectively.

In a third aspect, an embodiment of the present disclosure provides an electric stack, including a plurality of the above solid oxide fuel cells/electrolytic cells, and various solid oxide fuel cells/electrolytic cells being independently configured and connected in series or in parallel.

Compared with the prior art, the solutions of the embodiments of the present disclosure at least have the following advantages.

(1) The porous region for gas permeation, the dense region for gas sealing, and the fuel flow path for fuel circulation of the metal support frame in the solid oxide fuel cell/electrolytic cell may be flexibly molded in one step or more steps, such that the integration of structure and function of the metal support of the solid oxide fuel cell/electrolytic cell is realized, and the advantages such as no need of packaging, compact design, and high mass energy density are provided.

(2) The preparation process belongs to normal-temperature molding, and does not need to use the processes of drilling, welding, packaging, powder metallurgy, and high-temperature sintering, which simplifies the manufacturing process of the metal support of the solid oxide fuel cell/electrolytic cell, and has significant advantages such as high efficiency, low cost, and high reliability.

(3) Flexible design and fine preparation of the macro and micro structure of each part of the metal support may be realized according to specific needs, and it has the advantages such as fine structure and high processing accuracy.

BRIEF DESCRIPTION OF DRAWINGS

In order to more clearly illustrate technical solutions in the embodiments of the present disclosure or in the prior art, accompanying drawings that need to be used in the description of the embodiments or the prior art will be introduced briefly below.

Figure 1:
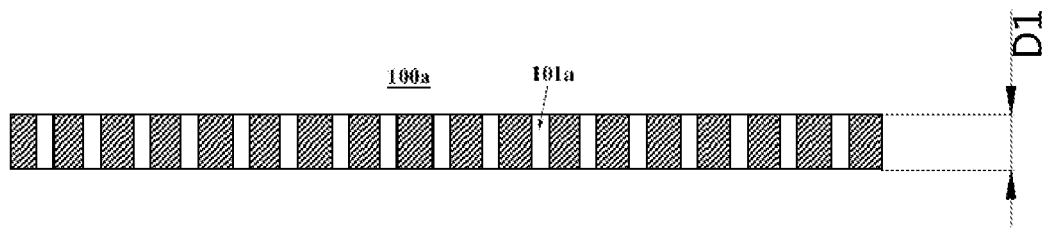
FIG. 1 is a structural schematic view of a first type of porous metal body in an embodiment of the present disclosure.

Reference signs: 100a—porous metal body; 101a—straight through hole; 100b—porous metal body; 101b—trapezoidal hole; 201a—dense metal body; 202—fuel flow path; 201b—dense metal body; 300a—metal support frame; 300b—metal support frame; 400—solid oxide fuel cell/electrolytic cell; 401—cell/electrolytic cell functional layer; 4011—cathode layer or anode layer; 4012—electrolyte layer; 4013—anode layer or cathode layer; 500—solid oxide fuel cell/electrolytic cell.

DETAILED DESCRIPTION OF EMBODIMENTS

Embodiments of the present disclosure will be described in detail below in combination with examples, while a person skilled in the art would understand that the following examples are merely used for illustrating the present disclosure, but should not be considered as limitation on the scope of the present disclosure. If no specific conditions are specified in the examples, they are carried out under normal conditions or conditions recommended by manufacturers. If manufacturers of reagents or apparatuses used are not specified, they are conventional products commercially available.

Specific description is made below for embodiments of the present disclosure.

The metal-supported SOFC has advantages such as high strength (bending strength, shock strength), and ease of processing and packaging compared with the conventional (ceramic-supported) SOFC. However, the metal support therein is usually prepared separately from the metal interconnector having a gas flow path, which does not realize the integration of structure and function, and can only realize single-side power generation.

Based on such reality, in an example of the present disclosure, a new structure and a manufacturing process thereof are proposed to fabricate a metal support structure with integrated metal support and metal interconnector in the above. Moreover, it was verified that the process has the advantages of simplicity and easy implementation, easy structure control according to requirements, low preparation temperature and difficult generation of cracks and so on.

In the example of the present disclosure, the above process is mainly to flexibly and conveniently fabricate a metal support frame of a solid oxide fuel cell/electrolytic cell based on the additive manufacturing technology. That is, the process is used in solid oxide fuel cell/electrolytic cell, especially solid oxide fuel cell/electrolytic cell including the above metal support frame.

The solid oxide fuel cell/electrolytic cell is a self-sealing cell or electrolytic cell. It is shaped in a flat plate structure or a flat tubular structure. Certainly, it may be understood that the solid oxide fuel cell/electrolytic cell also may be designed in other shapes or structures as required.

Taking a metal-supported SOFC in a flat plate structure as an example, the SOFC includes a support structure and a cell functional structure (anode-electrolyte-cathode). Evidently, the support structure provides a supporting function, so that the cell functional structure is supported to maintain a design shape, and meanwhile, the structure and the appearance shape of the cell are also constrained to a certain extent.

Typically, the support structure is a metal support frame which has a dense region and a porous region both being arranged in a layered form. For convenience of description, in the following description of the present disclosure, the porous region in the metal support frame is described and referred to as a porous metal body, and the dense region is described and referred to as a dense metal body. This will not be described later.

In the example of the present disclosure, a support structure of a metal-supported SOFC, i.e., an independent porous metal body, or a metal support frame based on the porous metal body is fabricated. The metal support frame is integrally molded and includes the porous metal body as described above.

In other words, a porous metal body 100a as shown in FIG. 1 is proposed in the example. The porous metal body 100a is fabricated by additive manufacturing. As an application of the metal-supported solid oxide fuel cell/electrolytic cell 400 of the flat plate type, the porous metal body 100a substantially is in a flat plate shape or similar structures.

As an example, the porous metal body 100a is in a flat cuboid structure having a relatively small height or thickness, for example, 0.1 mm, 0.5 mm, 1 mm, 2 mm, 3 mm, 4 mm, 5 mm, 6 mm, 7 mm, 8 mm, 9 mm, 10 mm, or any numerical value in a range formed by any two of the foregoing numerical values; it has a larger length and width, for example, a longitudinal section formed has an area of 1 square centimeter, 5 square centimeters, 10 square centimeters, 20 square centimeters, 30 square centimeters, 40 square centimeters, 50 square centimeters, 60 square centimeters, 70 square centimeters, 80 square centimeters, 90 square centimeters, 100 square centimeters, 150 square centimeters, 160 square centimeters, 200 square centimeters, 210 square centimeters, 250 square centimeters, 280 square centimeters, 300 square centimeters, 350 square centimeters, 380 square centimeters, 400 square centimeters, or any numerical value in a range formed by any two of the foregoing numerical values.

Figure 2:
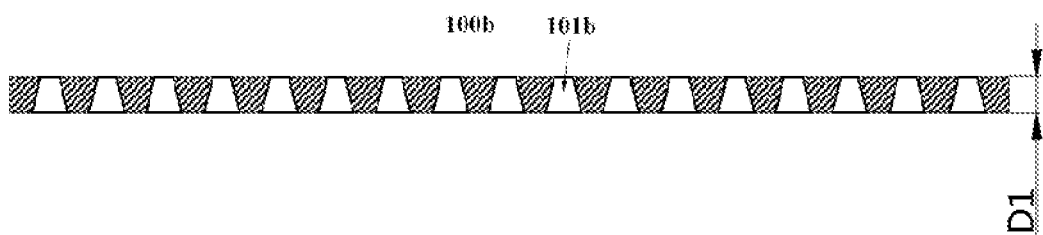
FIG. 2 is a structural schematic view of a second type of porous metal body in an embodiment of the present disclosure.

Further, the porous structure thereof may be realized by forming through holes uniformly distributed on the surface of the metal plate. For example, the porous structure is composed of holes with a pore size of 10 to 150 micrometers (which also may be 40 to 110 micrometers, or 80 to 100 micrometers, etc.), with the porosity of 10%-60%. The holes may be specifically in a regular shape, such as straight through holes 101a (which may be cylindrical holes or prismatic holes as shown in FIG. 1) or trapezoidal holes 101b disclosed in the porous metal body 100b (as shown in FIG. 2), and also may be holes in other shapes.

The material for fabricating the porous metal body 100a may be any one of Fe-based alloy, Ni-based alloy, Co-based alloy, and Cr-based alloy. In a preferred example, the porous metal body 100a is made of Fe-based alloys, such as SS430.

It should be noted that, depending on the specific design requirements and different cell functional structures of the solid oxide fuel cell/electrolytic cell 400, the shape, dimension, fabrication material, and the like of the porous metal body 100a may be adjusted and freely selected in the above without being limited to those given above.

The method of fabricating the porous metal body 100a may be realized by fabricating a metal material, for example, a plate-shaped metal material, into a porous structure by additive manufacturing. Generally, it includes building a three-dimensional model of the porous metal body 100a, then exporting it, importing it to an additive manufacturing device through slicing software, setting printing parameters, for example, including but not limited to, scan pitch, scan speed, scan mode, pre-heating temperature, powder laying speed, shielding gas, and laser/electron beam power, and then performing additive manufacturing for fabrication.

In the above, the additive manufacturing may use laser/electron beam as a heating source, i.e. laser/electron beam additive manufacturing, and certainly, other types of energy sources also may be possible. More specifically, the laser/electron beam additive manufacturing may be powder-feeding additive manufacturing, or powder-laying additive manufacturing. The powder material is heated and melted by the laser/electron beam, and then each thin layer is fabricated and printed. A target product in a desired shape is fabricated by stacking the thin layers layer by layer.

Figure 3:
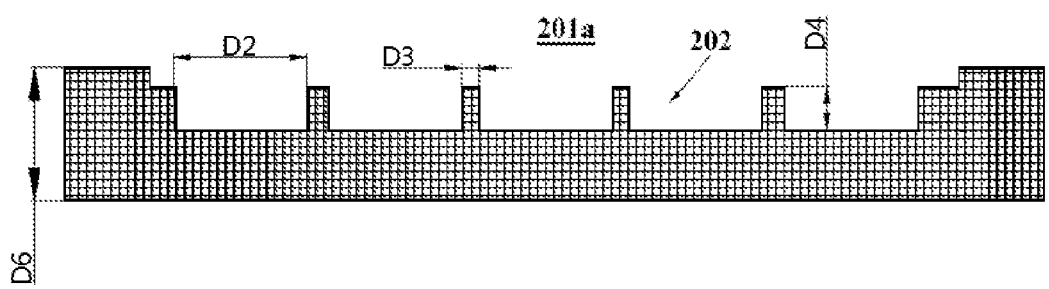
FIG. 3 is a structural schematic view of a first type of dense metal body in an embodiment of the present disclosure.
Figure 5:
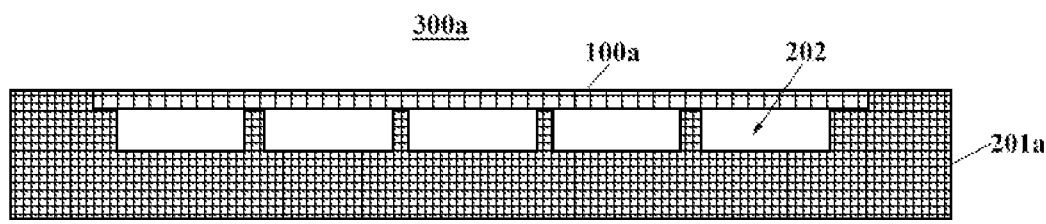
FIG. 5 is a structural schematic view of a metal support, based on the porous metal body in FIG. 1 and the dense metal body in FIG. 3, in an embodiment of the present disclosure.
Figure 6:
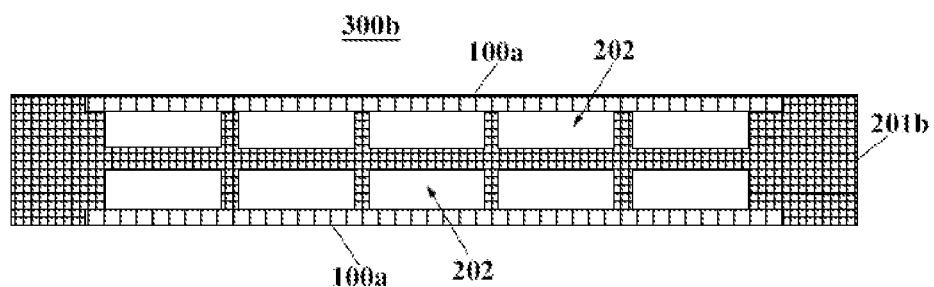
FIG. 6 is a structural schematic view of another metal support, based on the porous metal body in FIG. 2 and the dense metal body in FIG. 4, in an embodiment of the present disclosure.

Further, based on the foregoing porous metal body 100a, a metal support frame 300a (as shown in FIG. 5) and a metal support frame 300b (as shown in FIG. 6) are also proposed in the example. It includes a dense metal body 201a (as shown in FIG. 3) and a porous metal body 100a. Moreover, the dense metal body 201a and the porous metal body 100a are arranged in a composite structure and integrally molded in one step by additive manufacturing. By means of such a manufacturing method, it may be ensured that the two have a smooth abutment surface and are bonded well. Moreover, due to the use of the integrated process of additive manufacturing, it is conducive to realizing the better self-sealing property of the fuel cell/electrolytic cell, and an oxygen airway may be prevented from being specially provided. Meanwhile, since it is unnecessary to provide the oxygen airway, the structure of the cell is also simplified, and the cell stack is conveniently fabricated.

It should be mentioned that although the dense metal body 201a and the porous metal body 100a are described in the metal support frame 300a, this does not mean that the dense metal body 201a and the porous metal body 100a can only be made of a metal material. In practice, for other types of solid oxide fuel cells/electrolytic cells, non-metal materials such as ceramics may also be selected as necessary or required for fabrication. In addition, the metal material therein may refer to either elemental metal or alloy, for example, the aforementioned Fe-based alloy, Ni-based alloy, Co-based alloy or Cr-based alloy, for example, specifically and preferably, SS430, or may be any one of Fe-30Cr, Fe-26Cr, Fe22Cr, SS430, Ni, and Hastelloy X. In other words, the fabrication materials of the dense metal body 201a and the porous metal body 100a may be the same or different, and the present disclosure does not make particular limitation thereto.

Further, based on the needs of simplifying the process or division of fabricating the solid oxide fuel cell/electrolytic cell, a dense metal body 201a having a fuel flow path may be further fabricated, and the position of the fuel flow path is directly opposite to the porous metal body 100a, that is, the fuel flow path is covered by the porous metal body 100a. The fuel flow path may serve as a distribution and injection passage of fuel in the solid oxide fuel cell/electrolytic cell 400, and is therefore referred to as a fuel passage 202, referring to FIG. 3. It should be noted that, in the solid oxide fuel cell solution of the example of the present disclosure, the dense metal body 201a shown in FIG. 3 and the dense metal body 201b shown in FIG. 4 each contain a fuel passage, but without an oxygen airway or an air airway. That is, in the example of the present disclosure, only a fuel supply passage is actively arranged, but an oxygen supply passage is not designed (in the present disclosure, oxygen is supplied by the environment/atmosphere). This is distinguished from the design solution of the dual passages for fuel and oxygen usually adopted in the current fuel cells, thus helping to reduce the fabrication difficulty, compress the volume, and then improve the mass energy density of the fuel/electrolytic cell.

In conjunction with the additive manufacturing process, the fuel passage 202 may be designed correspondingly at a model design stage of the metal support frame 300a, so that the dense metal body 201a having the fuel passage 202 can be formed directly during subsequent additive manufacturing (an exemplary solution of the present disclosure). Therefore, when fabricating the metal support frame 300a, the dense metal body 201a having the fuel passage and the porous metal body 100a are integrally molded in one step. In the above, the fuel passage may be designed in various ways as required, for example, a parallel structure (having parallel channels), a serpentine structure (serpentine channel), a parallel serpentine structure, an interdigitated structure (having an interdigitated channel), or a mesh structure (having a mesh flow path).

Alternatively, in some cases, the integrally molded solid dense metal body 201a and porous metal body 100a may be fabricated first by additive manufacturing. Then, on this basis, the solid dense metal body 201a is subjected to conventional machining or other processing manners, so as to fabricate the fuel passage.

Figure 7:
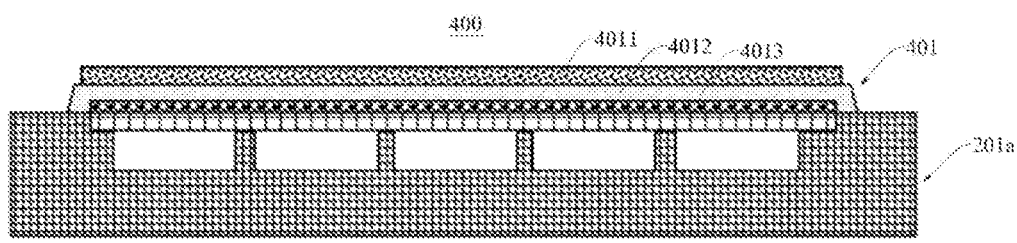
FIG. 7 is a structural schematic view of a solid oxide fuel cell/an electrolytic cell, based on the metal support in FIG. 5, in an embodiment of the present disclosure.
Figure 8:
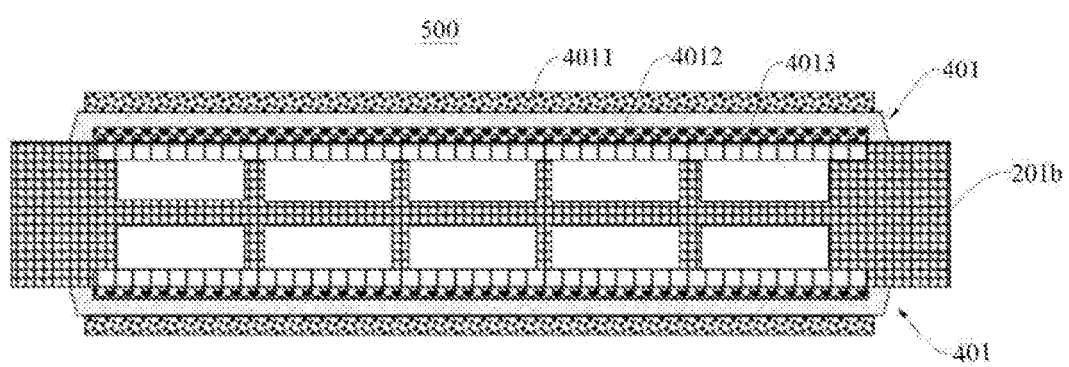
FIG. 8 is a structural schematic view of the solid oxide fuel cell/the electrolytic cell, based on the metal support in FIG. 6, in an embodiment of the present disclosure.

In the above application example of the dense metal body and the porous metal body, the structure of the single-sided solid oxide fuel cell/electrolytic cell 400 is as shown in FIG. 7, and the structure of the double-sided solid oxide fuel cell/electrolytic cell 500 is as shown in FIG. 8.

As for the single-sided solid oxide fuel cell/electrolytic cell 400 as shown in FIG. 7, the dense metal body 201a has the fuel passage 202 at one side (refer to FIG. 3). In the structure shown in FIG. 7, the fuel passage 202 is located between the porous metal body 100a and the dense metal body 201a, thus forming a specific path. Accordingly, the fuel/electrolytic cell is fabricated on the porous metal body 100a in combination with thermal spraying, tape casting, screen printing or chemical vapor deposition method, so that the single-sided solid oxide fuel cell/electrolytic cell 400 (as shown in FIG. 7) may be obtained.

Figure 4:
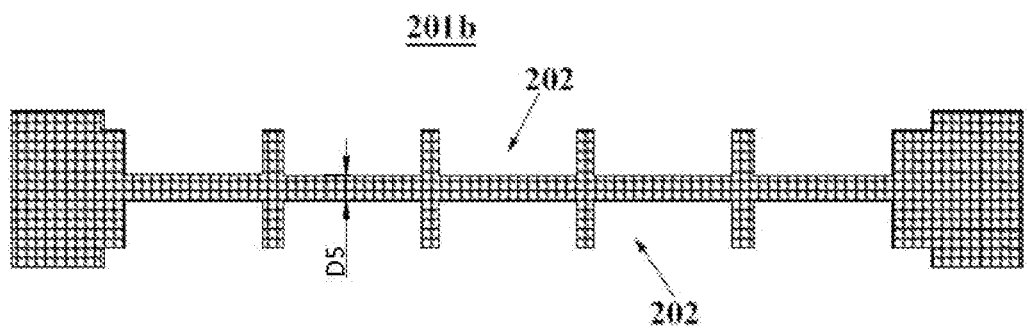
FIG. 4 is a structural schematic view of a second type of dense metal body in an embodiment of the present disclosure.

Correspondingly, in some other examples, as shown in FIG. 4, the dense metal body 201b may have the fuel passages 202 located at two opposite sides (e.g. front side and back side). The fuel passage 202 is located between the porous metal body 100a and the dense metal body 201b, so as to form a specific path. Accordingly, the cell functional structure is fabricated on the porous metal bodies 100a at two sides in combination with thermal spraying, tape casting, screen printing or chemical vapor deposition method, so that the double-sided solid oxide fuel cell/electrolytic cell 500 (as shown in FIG. 8) may be obtained. The double-sided solid oxide fuel cell/electrolytic cell 500 may significantly improve the space utilization rate, reduce the cell volume, and reduce the preparation cost. Meanwhile, as power generation is carried out with the double passages at two sides (fuel flow paths at two sides) in parallel, the fuel utilization rate is greatly improved, and the mass energy density of the cell is improved.

In the metal support frame 300a, the dense metal body 201a and the porous metal body 100a may be of a circular structure, a square structure or other shapes (based on the shape of a longitudinal section profile). As shown in FIG. 5 to FIG. 6, each shows a cross section along the thickness direction of the metal support frame 300a (or the thickness direction of the metal support 300b), and the longitudinal section above is a plane perpendicular to the preceding cross section.

In addition, the longitudinal section of the dense metal body 201a may be limited to have an area of 1 to 400 square centimeters, for example, the area may be 1 square centimeter, 5 square centimeters, 10 square centimeters, 20 square centimeters, 30 square centimeters, 40 square centimeters, 50 square centimeters, 60 square centimeters, 70 square centimeters, 80 square centimeters, 90 square centimeters, 100 square centimeters, 150 square centimeters, 160 square centimeters, 200 square centimeters, 210 square centimeters, 250 square centimeters, 280 square centimeters, 300 square centimeters, 350 square centimeters, 380 square centimeters, 400 square centimeters, or any numerical value in a range formed by any two of the foregoing numerical values. That is, the dense metal body has approximately the same longitudinal section area as the aforementioned metal support frame 300a. However, generally, in the metal support frame 300a, the longitudinal section area of the dense metal body 201a is generally larger than the longitudinal section area of the porous metal body 100a.

For the convenience of a person skilled in the art to implement the exemplary solutions of the present disclosure, the method of fabricating the metal support frame 300a is described in detail below.

In general, the method of fabricating the metal support frame 300a includes fabricating the dense metal body 201a and the porous metal body 100a layer by layer in a manner of additive manufacturing. For example, by performing three-dimensional modeling on the metal support frame 300a of the above design, a three-dimensional model thereof is obtained, and then the model is processed by software into a file required by an additive manufacturing device. Then, raw materials, a working gas, etc., are assembled with the additive manufacturing device, and printing parameters are set for printing and fabrication.

In some examples, depending on different printing materials, the above additive manufacturing may be a solution combining laser/electron beam or other methods employed in the additive manufacturing process. In the above, the laser/electron beam is mainly selected according to a scan speed, a melting point of the material, the dimension and specification of a target printing product, the thickness of a printing layer, etc., and is not particularly limited.

As described above, in the metal support frame 300a, the dense metal body 201a and the porous metal body 100a are included. In the above, the dense metal body 201a may serve as a support structure of the whole solid oxide fuel cell/electrolytic cell 400 (certainly, including the porous metal body); meanwhile, the porous metal body 100a also may correspondingly serve as a support structure of the fuel/electrolytic cell functional layer 401 (anode-electrolyte-cathode) in the solid oxide fuel cell/electrolytic cell 400, and it further may provide a pathway passage (such as the fuel passage 202) for providing fuel for the above fuel/electrolytic cell functional layer 401.

Therefore, the dense metal body 201a and the porous metal body 100a may be distinguished in shape, material, and microstructure. This may be realized by parameter selection of laser/electron beam assisted additive manufacturing. Besides, when fabricating the metal support frame 300a, it also should be considered that the thermal expansion coefficients of the metal support frame and the fuel/electrolytic cell functional layer 401 are matched, so as to prevent the problems such as crack generation caused by accumulating heat or failing to dissipate heat during operation by metal support frame 300a and the fuel/electrolytic cell function layer 401, due to the difference in the thermal expansion coefficients.

In an example of the present disclosure, during the additive manufacturing, the scan pitch of the laser/electron beam is controlled to adjust the distance between molten pools of the printing material, thereby forming the dense metal body 201a and the porous metal body 100a. Specifically, the scan pitch for fabricating the dense metal body 201a is made smaller than the scan pitch for fabricating the porous metal body. Therefore, when the scan pitch is larger, the distance between adjacent molten pools is larger, thereby forming a hole, so as to fabricate a porous structure. Correspondingly, when the scan pitch is smaller, the adjacent molten pools are next to each other (without gap) or the gap is smaller, thereby forming a dense structure. Preferably, the scan pitch for fabricating the dense metal body 201a is 0.05 to 0.15 mm, or 0.05 to 0.10 mm, and the scan pitch for fabricating the porous metal body 100a is 0.1 to 0.5 mm, or 0.2 to 0.4 mm.

In addition, during the process of performing the additive manufacturing operation, the laser/electron beam power further may be selectively controlled.

For example, the laser/electron beam power for fabricating the dense metal body 201a is greater than or equal to the laser/electron beam power for fabricating the porous metal body. Exemplarily, the laser/electron beam power for fabricating the dense metal body 201a is 100 to 400 W; and the laser/electron beam power for fabricating the porous metal body is 50 to 250 W.

Further, as described above, a solid oxide fuel cell/electrolytic cell 400 further may be obtained on the basis of fabricating the above porous metal body 100a or metal support frame 300a. Still further, an electric stack is further provided in the example, which includes a plurality of solid oxide fuel cells/electrolytic cells 400, and various solid oxide fuel cells/electrolytic cells 400 are independently configured and connected in series.

The above solid oxide fuel cell/electrolytic cell 400 includes the fuel/electrolytic cell functional layer 401 and the metal support frame 300a (certainly, it also includes the porous metal body 100a or the porous metal body 100b), and can realize self-sealing (this may be realized after an electrolyte layer 4012 mentioned later in the fuel/electrolytic cell functional layer 401 is fabricated), thereby facilitating simplification of the fabricating process.

In the above, the fuel/electrolytic cell functional layer 401 includes an anode layer or a cathode layer 4013, the electrolyte layer 4012, and a cathode layer or an anode layer 4011 stacked in sequence. The method of forming the fuel/electrolytic cell functional layer includes any one of thermal spraying, tape casting, screen printing, or chemical vapor deposition method. Specifically, the preparation of the fuel/electrolytic cell functional layer 401 includes: coating, for example, a ceramic material, on the metal support frame 300a fabricated by additive manufacturing in a manner of thermal spraying, tape casting, screen printing or chemical vapor deposition, so as to fabricate various layers in the fuel/electrolytic cell functional layer 401, respectively.

Moreover, the fuel/electrolytic cell functional layer 401 is laminated on the porous metal body 100a or the metal support frame 300a. In the illustrated structure of the present disclosure, as shown in FIG. 7, the fuel/electrolytic cell functional layer 401 is in direct contact with the porous metal body 100a in the metal support frame 300a through the anode layer or the cathode layer 4013. In the above, in order to promote the fabrication and firm bonding of the anode layer or the cathode layer 4013 on the porous metal body 100a, a transition layer (not shown in the figures) further may be configured in the solid oxide fuel cell/electrolytic cell 400. The transition layer is formed and provided between the porous region and the cell/electrolytic cell functional layer. Specifically, the transition layer serves as a transition structure between the porous metal body and the anode layer or the cathode layer 4013, therefore, it is directly formed on the porous metal body 100a or the metal support frame 300a.

The above structure is disclosed by the single-sided solid oxide fuel cell/electrolytic cell 400 shown in FIG. 7. That is,
the porous metal body is provided at one side of the metal support frame 300a in the thickness direction, and the fuel/electrolytic cell functional layer 401 is correspondingly provided on the porous metal body. In some other examples, two opposite sides of the metal support frame 300b in the thickness direction are each provided with the porous metal body 100a, and correspondingly, the fuel/electrolytic cell functional layer 401 is fabricated on two porous metal bodies 100a, respectively. Meanwhile, the metal support frame 300b is provided, at either side, with the fuel passage 202 as the fuel injection passage, as shown in FIG. 8. The fuel passage 202 is provided at either side of the dense metal body 201b, with a structure as shown in FIG. 4. In such a solid oxide fuel cell/electrolytic cell 500, two cell/electrolytic cell functional layers 401 are provided, and are symmetrically distributed and integrally molded by sharing the dense metal body 201b.

In the structure illustrated in the above, the dense metal body 201a of the metal support frame 300a has a larger longitudinal section area, while the porous metal body and the fuel/electrolytic cell functional layer 401 have a smaller longitudinal section area. And generally, the porous metal body, the anode layer or the cathode layer 4013, and the cathode layer or the anode layer 4011 have substantially consistent longitudinal section areas. Therefore, along the thickness direction of the metal support frame 300a, projections of the anode, the cathode, and the porous metal body substantially coincide with each other. The electrolyte layer 4012 has a longitudinal section area slightly larger than that of the anode layer or the cathode layer 4013, so that the periphery of the electrolyte layer 4012 protrudes beyond the periphery of the anode layer or the cathode layer 4013, and further can seal the metal support frame 300a.

In further studies, operating conditions, output power and so on of the metal-supported self-sealing solid oxide fuel cell/electrolytic cell fabricated on the basis of the above solution may change in some examples. The inventors believe that this may be caused by deterioration in fuel delivery stability of the cell.

In further studies, the inventors have surprisingly found that the deformation of the fuel passage in the metal support frame (or referred to as metal support) causes the fluctuation of the fuel flow rate or normal delivery therein. Upon analysis and experiment confirmation, this is associated with the dimensions of the porous metal body, the dense metal body, and the fuel passage therein.

For example, as the porous metal body covers the dense metal body, the porous metal body is suspended in the fuel passage of the dense metal body. The porous metal body is supported by the dense metal body. When the dense metal body cannot provide stable support, the porous metal body may be recessed into the fuel passage, thereby changing the shape and section area of the fuel passage, thus affecting the flow rate of fuel in the fuel passage. Moreover, such change is gradually generated, that is, it occurs after the cell has been used for a period of time, and therefore, it cannot be found in advance.

In addition, since the collapse of the porous metal body will cause changes to the pore structure and shape therein, the smooth delivery of the fuel further deteriorates.

In view of this, in some examples of the present disclosure, the structural dimension of the cell is controlled to improve the structural stability thereof. In the metal support frame shown in FIG. 5, the fuel flow path has a plurality of partition walls (four in the structure shown in the drawing), and each two adjacent partition walls define one sub-flow path, that is, the fuel passage has five sub-flow paths.

Referring to FIG. 1 to FIG. 4, in such a structure, width D2 of the sub-flow path is 0.5-10 mm, for example, 0.5 mm, 1 mm, 2 mm, 3 mm, 4 mm, 5 mm, 6 mm, 7 mm, 8 mm, 9 mm, 10 mm, and any numerical value in a range formed by any foregoing point values, and the thickness of the partition wall D3 is not less than 0.1 mm. Meanwhile, thickness D4 of the dense metal body is not less than 0.3 mm, thickness D6 as the thickest part of the dense metal body is not less than 2 mm, and thickness of the porous metal body D1 is not less than 0.1 mm. Further, when two fuel/electrolytic cell functional layers are provided (as shown in FIG. 6), the metal support frame 201b has two separate fuel flow paths spaced by the separating walls, and thickness D5 of the separating walls is not less than 0.2 mm. The inventors found that only in the above range of structure dimensions, it can be better realized that the fabricated cell structure does not collapse and has enough support force.

The present disclosure is further described in detail below in combination with embodiments.

Embodiment 1

A metal-supported self-sealing solid oxide fuel cell/electrolytic cell, fabricated based on the additive manufacturing, with SS430 as a fabrication material, is described.

1. First, three-dimensional modeling is performed for a porous metal body, a dense metal body, and a fuel flow path included in a metal support frame through three-dimensional drawing software.

2. A metal support frame model having subjected to the three-dimensional modeling is exported, and the three-dimensional model is subjected to slicing processing through slicing software. After the slicing is completed, the sliced metal support frame model is imported into parameter editing software built in an additive manufacturing device.

3. In the parameter editing software of the additive manufacturing device, laser/electron beam parameters are edited and set for the porous metal body and the dense metal body. In the above, the laser/electron beam scan pitch of the dense metal plate is smaller than that of the porous metal body, and the laser/electron beam power thereof is larger than that of the porous metal body. The dense metal plate has a scan pitch of 0.1 mm, a power of 150 W, and a scan speed of 700 mm/s. The porous metal body has a scan pitch of 0.25 mm, a power of 250 W, and a scan speed of 1400 mm/s.

4. After the laser/electron beam parameters are set, a pre-heating temperature of a substrate for the additive manufacturing, a powder laying speed of the device, pressure of the shielding gas, etc., are set. In the present embodiment, the material is SS430, the preheating temperature is selected to be 80° C., the powder laying speed of the device is 100 mm/s, and the pressure of the shielding gas is 0.65 bar.

5 After being set, the parameters are imported into an additive manufacturing machine for printing.

After the printing is completed, the dense metal body is molded into a dense physical structure, and the porous metal body is formed into a porous region as the laser/electron beam scan pitch is larger and the adjacent molten pools have a distance.

6. A surface of the metal support is subjected to sandblasting, coarsening or cleaning treatment. An anode, an electrolyte, and a cathode, or a cathode, an electrolyte, and an anode are sequentially prepared on the metal support by thermal spraying, tape casting, screen printing or chemical vapor deposition method, and self-sealing of the solid oxide fuel cell/electrolytic cell is realized with the dense structure of the electrolyte.

The above-mentioned are merely for preferred embodiments of the present disclosure and not intended to limit the present disclosure. For one skilled in the art, various modifications and variations may be made to the present disclosure. Any modifications, equivalent substitutions, improvements, and the like made within the spirit and principle of the present disclosure are intended to be included within the protection scope of the present disclosure.

INDUSTRIAL APPLICABILITY

As for the solid oxide fuel cell/electrolytic cell provided in the present disclosure, the metal support frame with a supporting function can be molded in one or more steps by the additive manufacturing process, thereby integrating the structure and function of the metal support frame, without additional packaging, and the integrally molded metal support frame is compact in design and high in mass energy density. Meanwhile, the additive manufacturing process adopted belongs to normal-temperature molding, and does not need to use the processes of drilling, welding, packaging, powder metallurgy, and high-temperature sintering, which simplifies the manufacturing process of the metal support frame of the solid oxide fuel cell/electrolytic cell electrochemical converter, and has significant advantages such as high efficiency, low cost, and high reliability.

What is claimed is:

1. A solid oxide fuel cell/electrolytic cell, comprising a metal support frame and a fuel/electrolytic cell functional layer, wherein the metal support frame comprises a dense region and a porous region, wherein the dense region and the porous region of the metal support frame are integrally molded by additive manufacturing, and the dense region has a fuel flow path and has no oxygen airway, wherein the fuel cell/electrolytic cell is only actively provided with a fuel supply passage, but an oxygen supply passage is not designed, wherein oxygen of the fuel cell/electrolytic cell is supplied by environment or atmosphere.

2. The solid oxide fuel cell/electrolytic cell according to claim 1, wherein the fuel cell/electrolytic cell is a self-sealing.

3. The solid oxide fuel cell/electrolytic cell according to claim 1, wherein the fuel flow path has a plurality of partition walls, and a plurality of sub-flow paths defined by two adjacent partition walls of the plurality of partition walls.

4. The solid oxide fuel cell/electrolytic cell according to claim 3, wherein the sub-flow path has a width of 0.5-10 mm, the partition wall has a thickness not less than 0.1 mm, the dense region has a thickness not less than 0.3 mm, and the porous region has a thickness not less than 0.1 mm.

5. The solid oxide fuel cell/electrolytic cell according to claim 1, wherein two fuel/electrolytic cell functional layers are provided, and the two fuel/electrolytic cell functional layers are symmetrically distributed and integrally molded by sharing the metal support frame.

6. The solid oxide fuel cell/electrolytic cell according to claim 5, wherein the metal support frame has two independent fuel flow paths separated by a separating wall in a laminating direction of the cell/electrolytic cell functional layers, and the separating wall has a thickness not less than 0.2 mm.

7. The solid oxide fuel cell/electrolytic cell according to claim 1, wherein the cell/electrolytic cell functional layer has an anode layer, an electrolyte layer, and a cathode layer, which are laminated layer by layer, or the cell/electrolytic cell functional layer has a cathode layer, an electrolyte layer, and an anode layer, which are laminated layer by layer, the cell/electrolytic cell functional layer is laminated on the porous region, and an edge of the electrolyte layer extends to and covers a position where the porous region and the dense region are bonded.

8. The solid oxide fuel cell/electrolytic cell according to claim 1, wherein the fuel cell/electrolytic cell comprises a transition layer, wherein the transition layer is provided between the porous region and the fuel/electrolytic cell functional layer.

9. The solid oxide fuel cell/electrolytic cell according to claim 1, wherein the solid oxide fuel cell/electrolytic cell is in a flat plate structure or a flat tubular structure.

10. The solid oxide fuel cell/electrolytic cell according to claim 1, wherein in the porous region, a hole has a size of 10 to 150 µm, with a porosity of 10%-60%.

11. The solid oxide fuel cell/electrolytic cell according to claim 10, wherein the hole is a straight through hole or a trapezoidal through hole.

12. The solid oxide fuel cell/electrolytic cell according to claim 1, wherein a longitudinal section profile of the dense region is formed in a circular shape or a square shape.

13. The solid oxide fuel cell/electrolytic cell according to claim 12, wherein a longitudinal section of the dense region has an area of 1 to 400 square centimeters.

14. The solid oxide fuel cell/electrolytic cell according to claim 12, wherein a fabrication material of the dense region is any one selected from the group consisting of Fe-based alloy, Ni-based alloy, Co-based alloy, and Cr-based alloy.

15. The solid oxide fuel cell/electrolytic cell according to claim 12, wherein a fabrication material of the dense region is 30Cr, Fe-26Cr, Fe-22Cr, SS430, Ni, or Hastelloy X.

16. The solid oxide fuel cell/electrolytic cell according to claim 1,
wherein a longitudinal section profile of the porous region is formed in a circular shape or a square shape.

17. A solid oxide fuel cell/electrolytic cell stack, comprising a plurality of the solid oxide fuel cell/electrolytic cell according to claim 1, wherein various solid oxide fuel cells/electrolytic cells are independently configured and connected in series or in parallel.

18. A fabrication method of a solid oxide fuel cell/electrolytic cell, wherein the fabrication method comprises:
fabricating a metal support frame in a composite structure through integral molding by adopting an additive manufacturing process, wherein the metal support frame comprises a dense region and a porous region that are laminated, wherein the dense region has a fuel flow path and has no oxygen airway, wherein the fuel cell/electrolytic cell is only actively provided with a fuel supply passage, but an oxygen supply passage is not designed, wherein oxygen of the fuel cell/electrolytic cell is supplied by environment or atmosphere, and the fuel flow path is covered by the porous region; and
fabricating, by thermal spraying, tape casting, screen printing or chemical vapor deposition method, an anode layer, an electrolyte layer and a cathode layer, or a cathode layer, an electrolyte layer and an anode layer, layer by layer on the porous region, so as to form a fuel/electrolytic cell functional layer, wherein an edge of the electrolyte layer extends and covers a junction of the porous region and the dense region to realize self-sealing,
wherein the additive manufacturing comprises: controlling a scan pitch and power of a laser/electron beam, so that a scan pitch for fabricating the dense region is less than a scan pitch for fabricating the porous region, and power for fabricating the dense region is greater than or equal to power for fabricating the porous region, so as to adjust a distance between molten pools of printing material, thus forming the dense region and the porous region, respectively.

19. The fabrication method according to claim 18, wherein the additive manufacturing comprises one or more of the following limitations:
first limitation: a scan pitch for fabricating the dense region is 0.05 to 0.15 mm;
second limitation: a scan speed for fabricating the dense region is 300-2000 mm/s;
third limitation: power of a laser/electron beam for fabricating the dense region is 100-400 W;
fourth limitation: a scan pitch for fabricating the porous region is 0.1 to 0.5 mm;
fifth limitation: a scan speed for fabricating the porous region is 500-1500 mm/s; and
sixth limitation: power of a laser/electron beam for fabricating the porous region is 50-250 W.

20. The fabrication method according to claim 18, wherein before preparing the fuel/electrolytic cell functional layer, a surface of the metal support frame is subjected to sandblasting, coarsening, or cleaning treatment.

\* \* \* \* \*